United States Patent
Eshghy

Patent Number: 5,433,301
Date of Patent: Jul. 18, 1995

[54] DISC BRAKE ASSEMBLY INCLUDING A CONFIGURED LOAD PLATE

[75] Inventor: Siavash Eshghy, Royal Oak, Mich.

[73] Assignee: Rockwell International Corporation, Pittsburgh, Pa.

[21] Appl. No.: 166,421

[22] Filed: Dec. 13, 1993

[51] Int. Cl.$^6$ ............................................. F16D 65/092
[52] U.S. Cl. ........................ 188/250 G; 188/250 R; 188/72.5
[58] Field of Search ............ 188/72.4, 72.5, 73.1, 188/73.36, 73.37, 250 B, 250 E, 250 G, 252, 253

[56] References Cited

U.S. PATENT DOCUMENTS

| | | | |
|---|---|---|---|
| 2,784,824 | 3/1957 | Hanslip | 192/107 T |
| 3,297,117 | 1/1967 | Freholm | 188/250 |
| 3,563,347 | 8/1969 | Hahm | 188/73.1 |
| 3,698,518 | 10/1972 | Boyles | 188/72.5 |
| 3,958,667 | 5/1976 | de Gennes | 188/73.1 |
| 4,705,146 | 11/1987 | Tarter | 188/218 A |
| 5,129,487 | 7/1992 | Kobayashi et al. | 188/250 B |
| 5,161,650 | 11/1992 | Taig | 188/72.4 |

FOREIGN PATENT DOCUMENTS 1480335  6/1965  Germany ..................... 188/72.5

*Primary Examiner*—Robert J. Oberleitner
*Assistant Examiner*—Chris Schwartz

[57] ABSTRACT

A force application system for a disc brake assembly in which twin pistons engage a configured load plate featuring stiffening ribs at specific locations to maximize the stiffness thereof seeking to provide uniformity of pressure transmitted therethrough to a friction pad. Additional uniformity of pressure is achieved by forming recesses in the backing plate of the friction pad proximate regions of pressure peaks. A singular recess at the point of pressure peak or recesses defined in a pattern identified by infinite element analysis may be utilized to optimize uniformity of pressure distribution.

4 Claims, 3 Drawing Sheets

DISC BRAKE ASSEMBLY INCLUDING A CONFIGURED LOAD PLATE

BACKGROUND OF THE INVENTION

1. Field of the Invention

The present invention relates to disc brake mechanisms and, more specifically, to a mechanism featuring a load plate configured to optimize the distribution of lining/rotor contact pressure.

2. Description of the Related Art

The present invention is particularly applicable to a disc brake assembly of the type which includes a rotor mounted for rotation with a vehicle wheel and a caliper straddling the periphery of the rotor. Friction pads are carded by the caliper on opposite sides of the rotor and are movable into contact with oppositely disposed friction surfaces of the rotor by actuating means driven by an air actuator. In a caliper disc brake, each friction pad is located intermediate one leg of the caliper and the adjacent friction surface of the rotor. The actuating mechanism is usually carried by one leg of the caliper and serves to move the friction pad adjacent to that leg axially into contact with the rotor. The reaction force of such contact draws the other leg of the caliper and the other friction pad into contact with the opposite surface of the rotor. Although various arrangements are known for applying force to fiction pads within a disc brake assembly, most impart the force directly to a backing plate defined as a flat semi-rigid structure. Some cases utilize a single piston, whereas others impart the force using dual annularly displaced pistons. In either case the lack of stiffness in the structure of the backing plate and the concentration of piston force at the region of contact results in a nonuniform pressure distribution causing peak forces in the friction material. As a result, nonuniform pressure distribution produces ineffective use of lining material such that the full effectiveness of the lining/rotor contact may not be realized. Therefore, there is a need for a disc brake assembly which applies force to a friction pad through a structurally stiff member that provides uniform pressure distribution between the lining and the rotor.

SUMMARY OF THE PRESENT INVENTION

The present invention is a force application system for a disc brake assembly in which twin pistons engage a configured load plate featuring stiffening ribs at specific locations to maximize the stiffness thereof seeking to provide uniformity of pressure transmitted therethrough to a friction pad. Additional uniformity of pressure is achieved by forming recesses in the backing plate of the friction pad proximate regions of pressure peaks. A singular recess at the point of pressure peak or recesses defined in a pattern identified by infinite element analysis may be utilized to optimize uniformity of pressure distribution.

These and other aspects of the present invention will become more readily apparent by reference to the following detailed description of the embodiments as shown in the drawings.

DETAILED DESCRIPTION OF THE PREFERRED EMBODIMENT

Figure 1:
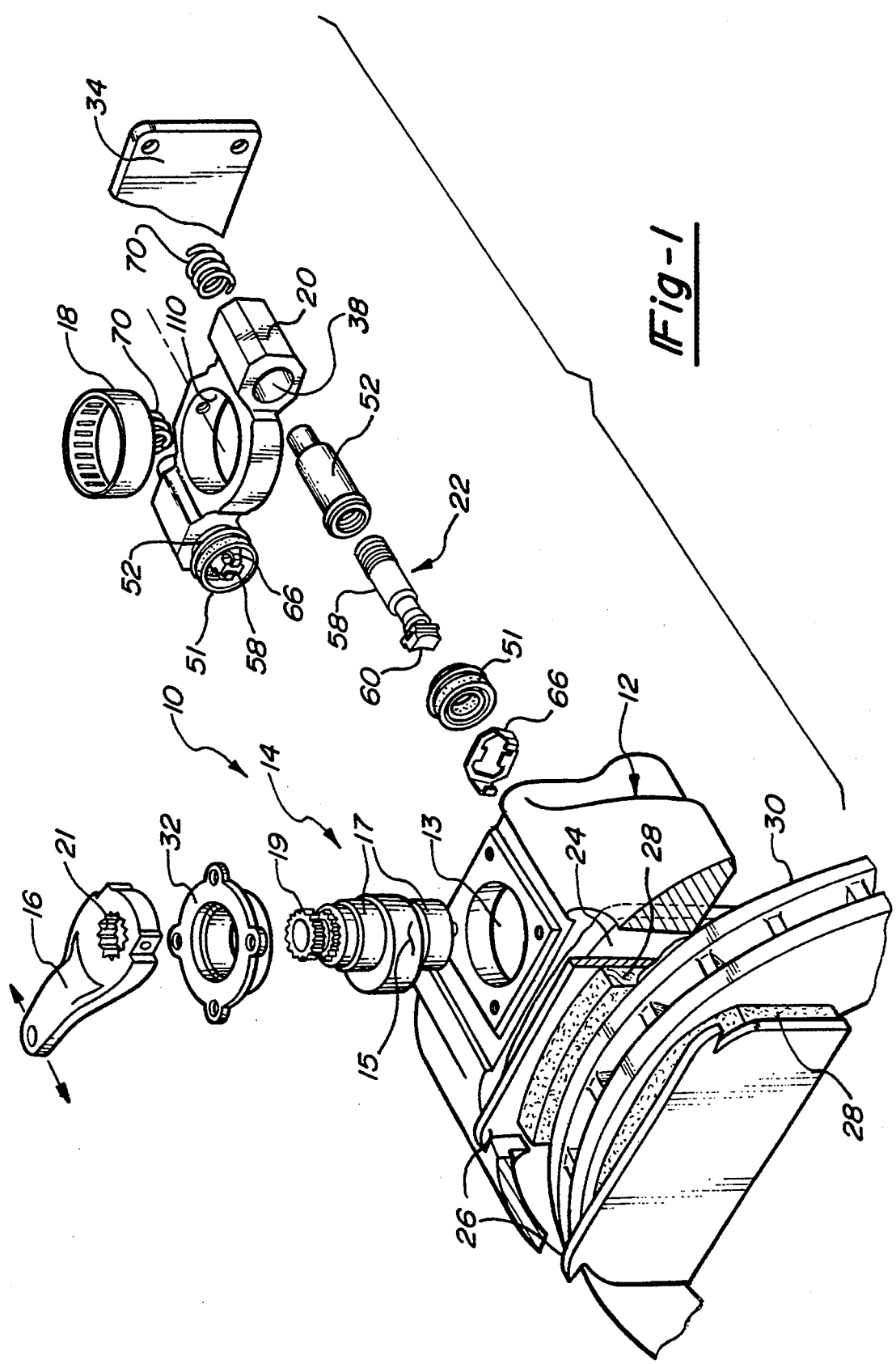
FIG. 1 is an exploded view of the components of a force application system in the context of a disc brake assembly including the load plate and friction pad backing plate of the present invention.

The preferred embodiment of the present invention as shown in FIG. 1 includes a brake assembly 10 including caliper housing 12 defining cavity 13. Eccentric assembly 14 includes eccentric 15 which is supported for rotation by sliding bearing journals 17, 17. Eccentric assembly 14 further includes male spline 19 cooperating with female spline 21 formed on actuating lever 16. Motive force for actuation of the present invention is provided by a reciprocating actuator (not shown) applying force to lever 16. Eccentric bearing retainer 32 defines the axis of rotation of eccentric assembly 14 within caliper housing 12. Eccentric bearing 18 is located within bore 110 of reciprocating element 20 to facilitate a low friction conversion of rotary motion of eccentric assembly 14 to reciprocating motion of reciprocating element 20. A pair of annularly displaced adjusting sleeve assemblies 22,22 are maintained within bore 38,38 defined in reciprocating element 20. Adjusting sleeve assemblies 22,22 are secured by clips 66,66 to load plate 24 which transmits force through backing plate 26 into friction material 28 upon application of force by reciprocating element 20. Clips 66,66 are secured to piston head 60 and load plate 24 to provide an anti-rotation effect as well as a self-aligning feature. In such a manner, friction material 28 is displaced into engagement with rotor 30 to retard rotation of same. Cover plate 34 defines a closed structure sealing cavity 13 of caliper housing 12.

Figure 2:
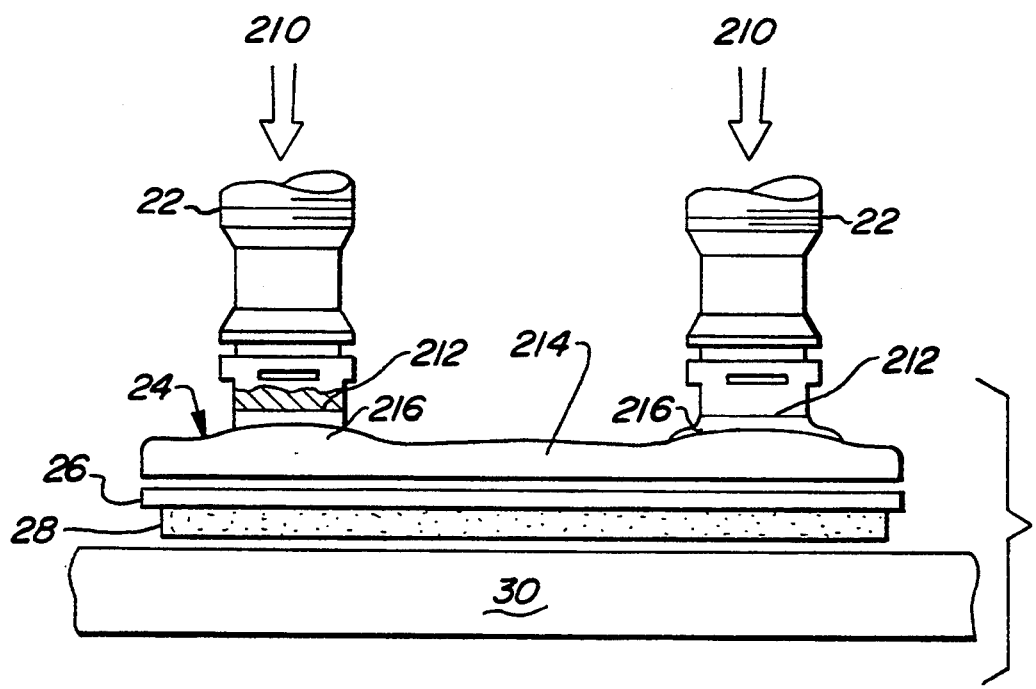
FIG. 2 is a partial schematic/partial cross sectional view of the present invention.
Figure 3:
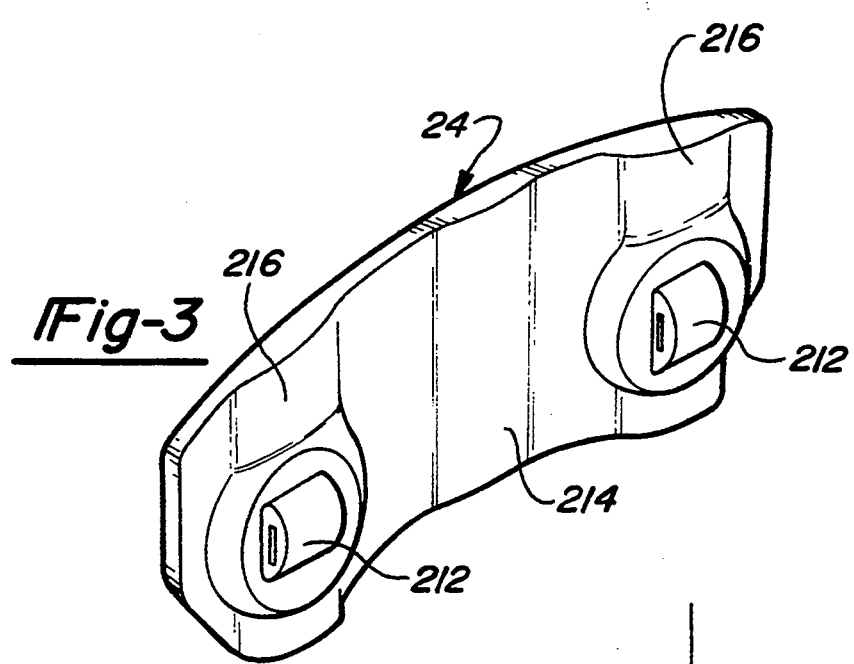
FIG. 3 is a plan view of the load plate of the present invention.
Figure 4:
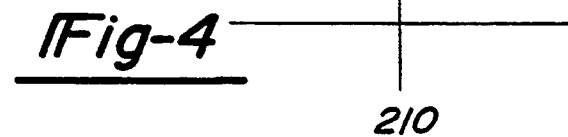
FIG. 4 is a diagram of the pressure distribution of a piston acting on a conventional load plate.
Figure 5:
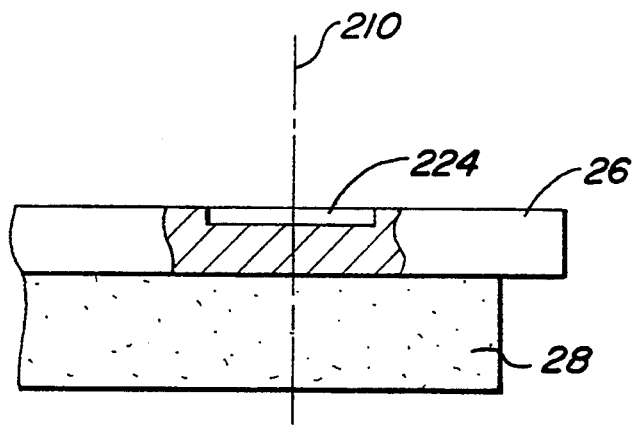
FIGS. 5 and 6 illustrate the recesses formed in the backing plate of the present invention.
Figure 6:
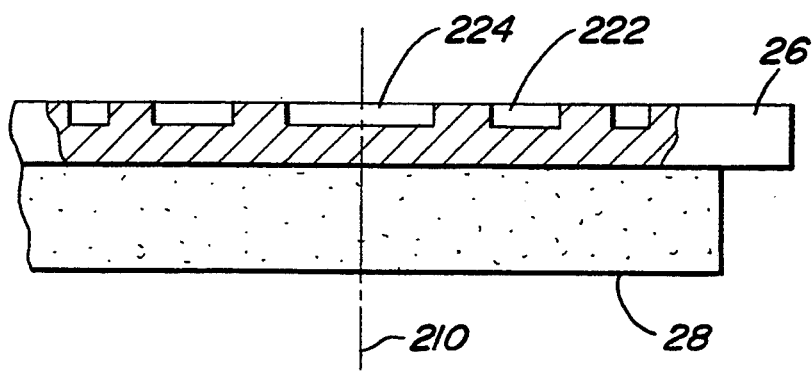
Figure 7:
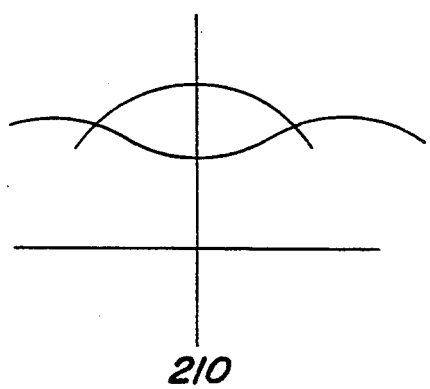
FIG. 7 is a diagram of the pressure distribution provided by backing plate recesses as taught in the present invention.

FIG. 2 is a partial schematic illustration of the force transmitted by an actuator not shown which is transmitting force along axis 210,210 through sleeve assemblies 22,22 which are engaged with piston receivers 212,212 defined as thicker cross sectional portions than the major portion of load plate 24. Intermediate stiffener 214 is also defined as a thicker cross sectional portion than the major portion of load plate 24. Force directed into load plate 24 as shown along axis 210,210 transmits a force concentrated at piston receivers 212,212. Load plate 24 is stiffened by an enlargement of cross section forming rib 216. A stiffening portion formed as intermediate rib 214 is annularly displaced and preferably disposed intermediate piston receivers 212,212. Load plate 24 is constructed by a casting or forging operation and presents a fiat planar surface which may be brought into abutment with backing plate 26. Although configured load plate 24 achieves an optimized stiffness, pressure peaks at lining 28/rotor 30 interface as shown along axis 210 continue to exist (see FIG. 4). Pressure peaks may be dissipated by defining a recess 224 in backing plate 26 proximate axis 210 as shown in FIGS. 5 and 6 to redistribute the pressure/stress lines. A singular recess 224 disposed in registration with axis 210 having a depth of one millimeter, as formed by a coining operation, will achieve a pressure redistribution as shown in FIG. 7.

Smaller coined recesses 222 formed adjacent to recess 224 produce additional distribution of pressure.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. In a disc brake assembly including friction pads, at least one of which may be axially displaced into engagement with a rotor rotatably maintained about an axis and drivingly associated with a vehicle wheel, said friction pad located adjacent a backing plate, said disc brake assembly including a force generating means for providing force to displace said friction pad into engagement with said rotor, said force generating means transmitting force via an apparatus including an axially extending member defining an outmost surface disposed for engagement with a load distribution assembly, said load distribution assembly comprising:

a load distribution member extending axially in relation to said rotor and disposed proximate thereto, said load distribution member having first and second opposite surface portions which are displaced axially from one another by structure integral thereto, Said axial displacement of said first and second opposite .surfaces having a first dimension;

said load distribution member including first and second laterally extending rib portions displaced from one another, said rib portions lying along said first surface, wherein said first surface at said rib portions is displaced axially from said second surface by a second axial displacement dimension larger than said first axial displacement dimension;

said axially extending member including first and second indentingly displaced surfaces disposed for registration with said first and second laterally extending rib portions; and first and second pressure peak dissipation recesses formed in said backing plate proximate axially with said first and second rib portions, said backing plate lying between said friction pad and said load distribution member.

2. The invention of claim 1 further including a third rib portion lying intermediate said first and second rib portions and lying along said first surface.

3. The invention of claim 2 wherein said backing plate includes at least one additional pressure dissipation recess formed in said backing plate.

4. The invention of claim 1 wherein said backing plate includes at least one additional pressure dissipation recess formed in said backing plate.

* * * * *